(12) United States Patent
Bortz et al.

(10) Patent No.: US 10,686,888 B2
(45) Date of Patent: *Jun. 16, 2020

(54) COMMUNICATION PROTOCOLS FOR AN ONLINE CONTENT MANAGEMENT SYSTEM

(71) Applicant: Dropbox, Inc., San Francisco, CA (US)

(72) Inventors: Andrew Bortz, San Francisco, CA (US); Sang Tian, San Francisco, CA (US); Joshua Kaplan, San Francisco, CA (US); Devdatta Akhawe, Berkeley, CA (US)

(73) Assignee: Dropbox, Inc., San Francisco, CA (US)

( * ) Notice: Subject to any disclaimer, the term of this patent is extended or adjusted under 35 U.S.C. 154(b) by 59 days.

This patent is subject to a terminal disclaimer.

(21) Appl. No.: 15/867,514

(22) Filed: Jan. 10, 2018

(65) Prior Publication Data

US 2018/0131773 A1 May 10, 2018

Related U.S. Application Data

(63) Continuation of application No. 14/984,993, filed on Dec. 30, 2015, now Pat. No. 9,894,162, which is a
(Continued)

(51) Int. Cl.
*G06F 21/00* (2013.01)
*H04L 29/08* (2006.01)
*H04L 29/06* (2006.01)

(52) U.S. Cl.
CPC ............ *H04L 67/141* (2013.01); *H04L 63/08* (2013.01); *H04L 67/02* (2013.01);
(Continued)

(58) Field of Classification Search
CPC . H04L 41/0896; H04L 47/14; H04L 41/5054; H04L 43/062; H04L 65/601
See application file for complete search history.

(56) References Cited

U.S. PATENT DOCUMENTS

2008/0275893 A1 11/2008 Bodin et al.
2013/0067568 A1 3/2013 Obasanjo et al.
(Continued)

FOREIGN PATENT DOCUMENTS

CN 102932439 * 2/2013

*Primary Examiner* — Ghazal B Shehni
(74) *Attorney, Agent, or Firm* — Polsinelli PC

(57) ABSTRACT

In some embodiments, a client application at a client device can receive, from a browser application at the client device, a first message including a unique identifier associated with a session of the browser application at a website associated with a content management system. The client application can extract the unique identifier from the first message, and establish a connection between the client application and the content management system by sending, from the client application to the content management system, a second message including the unique identifier. The client application can then receive, from the content management system through the connection, a third message relayed by the content management system from the website, where the third message is associated with the unique identifier.

20 Claims, 10 Drawing Sheets

500

506              504              502

NONCE         DOMAIN NAME      LOCAL HOST

Related U.S. Application Data continuation-in-part of application No. 14/469,138, filed on Aug. 26, 2014, now Pat. No. 9,516,107.

(60) Provisional application No. 62/008,428, filed on Jun. 5, 2014.

(52) U.S. Cl.
CPC .......... *H04L 67/1095* (2013.01); *H04L 67/16* (2013.01); *H04L 67/306* (2013.01)

(56) References Cited

U.S. PATENT DOCUMENTS

| | | |
|---|---|---|
| 2013/0298199 A1 | 11/2013 | Lord et al. |
| 2013/0332566 A1 | 12/2013 | Oscherov et al. |
| 2014/0165176 A1* | 6/2014 | Ow .................. H04L 63/10 726/8 |
| 2014/0181909 A1 | 6/2014 | Birk et al. |
| 2014/0282985 A1 | 9/2014 | Joseph et al. |
| 2014/0337491 A1* | 11/2014 | Barreto ............. G06F 16/182 709/221 |

\* cited by examiner

COMMUNICATION PROTOCOLS FOR AN ONLINE CONTENT MANAGEMENT SYSTEM

CROSS REFERENCE TO RELATED APPLICATIONS

This application is a continuation of U.S. application Ser. No. 14/984,993, filed on Dec. 30, 2015, entitled "COMMUNICATION PROTOCOLS FOR AN ONLINE CONTENT MANAGEMENT SYSTEM", which is a continuation-in-part of, and claims the benefit of priority to, of U.S. application Ser. No. 14/469,138, filed on Aug. 26, 2014, now U.S. Pat. No. 9,516,107, entitled "SECURE LOCAL SERVER FOR SYNCHRONIZED ONLINE CONTENT MANAGEMENT SYSTEM", which claims the benefit of U.S. Application No. 62/008,428, filed on Jun. 5, 2014, entitled "SECURE LOCAL SERVER FOR SYNCHRONIZED ONLINE CONTENT MANAGEMENT SYSTEM"; all of which are expressly incorporated by reference herein in their entireties.

This application is related to U.S. application Ser. No. 14/985,072, entitled "CROSS-APPLICATION AUTHENTICATION ON A CONTENT MANAGEMENT SYSTEM", filed on Dec. 30, 2015, which is expressly incorporated by reference herein in its entirety.

TECHNICAL FIELD

The present technology pertains to network communications, and more specifically pertains to communication protocols for enabling communications between a client application and a website associated with a content management system.

BACKGROUND

An online synchronized content management system, such as DROPBOX from Dropbox Inc. of San Francisco, Calif., allows users to store their content items in an online user account that can be accessed from any computing device. Users can upload content items from one computing device to their online user account and access the uploaded content items from other computing devices. Users can also share uploaded content items with other users, to provide other users access to the shared content items from their respective devices.

Users can access the content items from a browser application installed on the user's client device. For example, a user can use a web browser to access the content items from a website of the content management system. Users can also access the content items from a client-side application installed on the user's client device. Often, users may have both a web browser application and a client-side application installed on the user's client device, which they can use, either together or alone, to access content items on the content management system. The ability to use both types of applications to access content on the content management system can confer various benefits to the user. For example, the client-side application can offer persistent and seamless synchronization of local data with the content management system, while the web browser application may offer a different, web-based experience to the user.

To provide a richer experience to the user, it would be advantageous to enable seamless and transparent interactions between the content management system and the various types of applications and components at the client device. This can enable a unified experience to the user, with better integration between the various components of the online content management system and client device.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for communications protocols for an online content management system. An online content management system can provide a user with a client-side application and a web interface for accessing features provided by the content management system. The client-side application can be installed at a client device and used to synchronize local content at the client device with the content management system. In addition, the client-side application can be used to access content hosted on the local content management system through an interface of the client-side application. The client-side application can also access restricted or account-specific content by authenticating with the content management system through a registered user account.

A web browser installed at the client device can also be used to access content and features at the content management system through the web interface. The web browser can authenticate with the content management system, through the web interface, to access restricted or account-specific content. Users at the client device can thus interact with the content management system through the client-side application and/or browser application. Users can also interact with the content management system through client-side applications or browser applications at other client devices.

The content management system can support communication protocols that enable the content management system, client-side application, web browser application, and web interface to communicate with each other. For example, the content management system can support communications between the web interface and the client-side application, and vice versa. Such communication protocols can allow the content management system to provide a better user experience, through a seamlessly integrated environment. For example, users can establish sessions with the content management system through the client-side application and the browser application. The client-side application, browser application, content management system, and web interface can use specific communication protocols to interact with each other in order to integrate or improve the client-side and browser application sessions. This can result in a better, even unified, experience to the user.

In some embodiments, a client application at a client device can receive, from a browser application at the client device, a first message including a unique identifier associated with a session of the browser application at a website associated with a content management system. The website can be a web interface for the content management system. Moreover, the unique identifier can be a nonce or identifier that is unique and/or specific to the browser session, browser application, and/or user account associated with the browser session. For example, the identifier can be based on data or details about the browser session, browser application, and/or user account associated with the browser session.

The client application can extract or identify the unique identifier from the first message, and establish a connection between the client application and the content management system by sending, from the client application to the content management system, a second message including the unique identifier. The content management system can receive the second message from the client application and extract or identify the unique identifier in the second message. The content management system can correlate the client application, browser application, and/or browser session with each other based on the unique identifier. For example, the content management system can associate the unique identifier received from the client application with a unique identifier associated with the browser application and/or session.

The client application can then receive, from the content management system through the connection, a third message originating from the browser application that was previously received by the content management system from the browser application in association with the unique identifier. For example, the browser application and/or web interface can send a message for the client application to the content management system. The content management system can confirm the identity of the correct client application to receive the message based on the unique identifier. The content management system can then send the message to the client application as intended. The content management system can also relay messages from the client application to the web interface and/or browser application in similar fashion.

The content management system and web interface may interact with, and receive communications from, numerous client applications and browser applications at different devices. The content management system can thus use respective unique identifiers to relay messages to the correct or intended client and/or browser applications. This mechanism can also enable the web interface to exchange messages with the client application associated with the browser application at the client device. Such messages can be exchanged through the content management system.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for effective and efficient integration and communication between client-side applications (e.g., desktop applications, mobile applications, etc.) and browser applications at client devices. Disclosed are systems, methods, and computer-readable media for communication protocols for an online content management system. The communication protocols can enable integration and communication between client-side applications and browser applications at client devices, as well as associated sessions, through an online content management system. The client-side application can be used to interact with the online content management system through an interface of the client-side application. The browser application can provide a web-based interface for interacting with the online content management system.

Users can establish sessions with the online content management system through the client-side application and the browser application. The online content management system can implement communication protocols to enable interaction or communication between the client-side application and the browser application. Such interaction or communication can allow for an improved, integrated, and/or unified user experience across the different types of sessions or applications associated with the online content management system.

Figure 1:
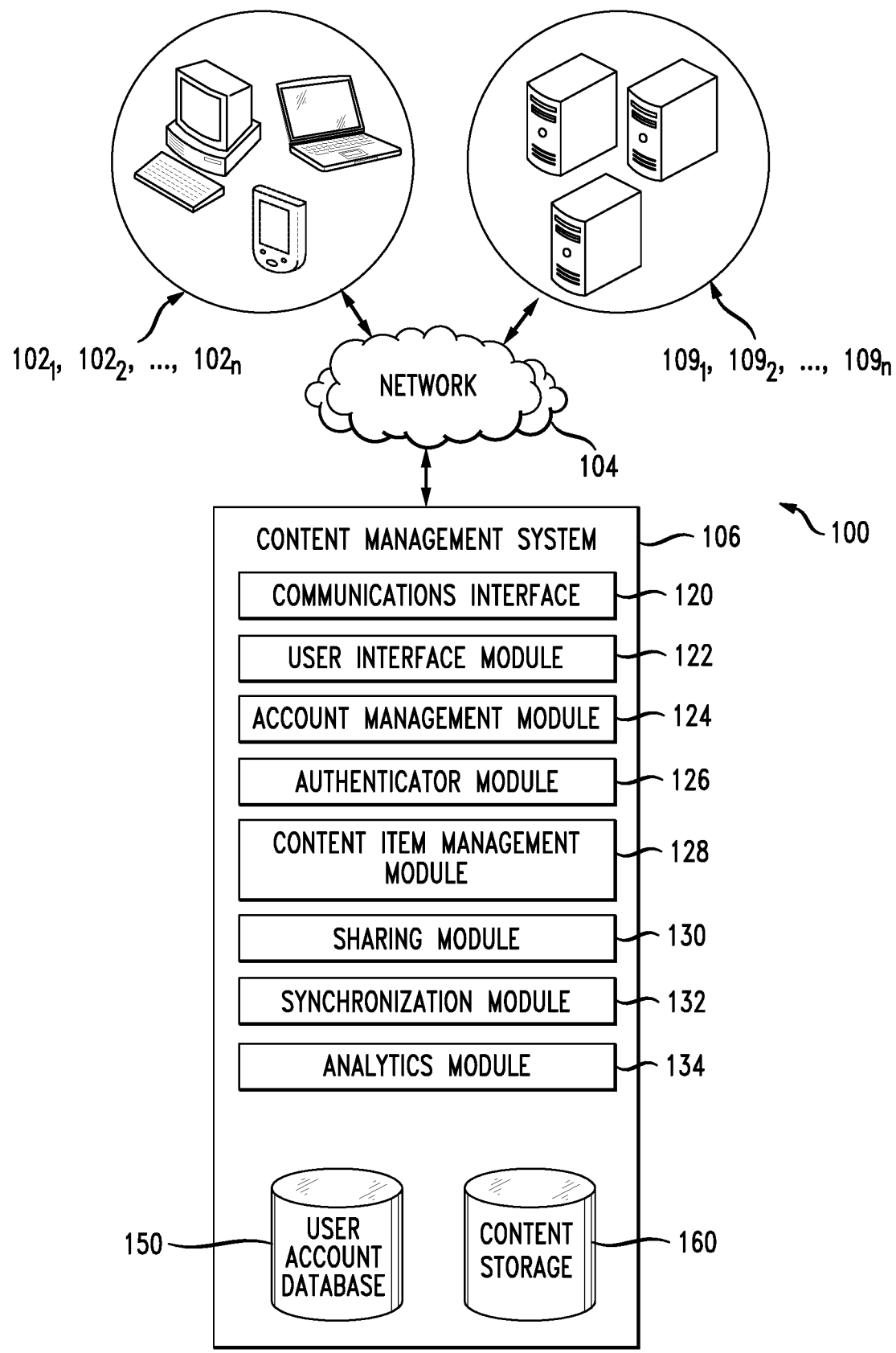
FIG. 1 shows an example configuration of devices and a network in accordance with various embodiments of the present technology.

With respect to implementing various embodiments of the disclosed technology, an exemplary system configuration 100 is shown in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 through client devices $102_1$, $102_2$, ..., $102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

Content management system 106 can include one or more servers or devices. For example, content management system 106 can include a server or a cluster of servers and/or storage devices, for example. Each server within content management system 106 can include one or more modules (e.g., 120-136). For example, content management system 106 can include modules 120-136 in a single server and/or multiple servers.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device 102, and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device 102, can upload content to content management system 106 via network 104. The content can later be retrieved from content management system 106 using the same client device 102, or some other client device $102_i$.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content items, such as digital data, documents, text files, audio files, video files, etc., from one or more client devices 102 authorized on the account. The content items can also include folders or other mechanisms of grouping content items together with different behaviors, such as collections, playlists, albums, etc. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content items can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content items from one or more client devices 102. The synchronization can be platform agnostic. That is, the content items can be synchronized across multiple client devices 102 of varying type, capabilities, operating systems, etc. For example, client device 102, can include client software, which synchronizes, via a synchronization module 132 at content management system 106, content in client device $102_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content items that has been updated at content management system 106 and synchronize those changes to the local folder. The client software can provide notifications of synchronization operations, and can provide indications of content statuses directly within the content management application. Sometimes client device 102, may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include a communications interface 120 for interfacing with various client devices 102, and can interact with other content and/or service providers 109$_1$, 109$_2$, . . . , 109$_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access files. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or less components are also possible.

Figure 2:
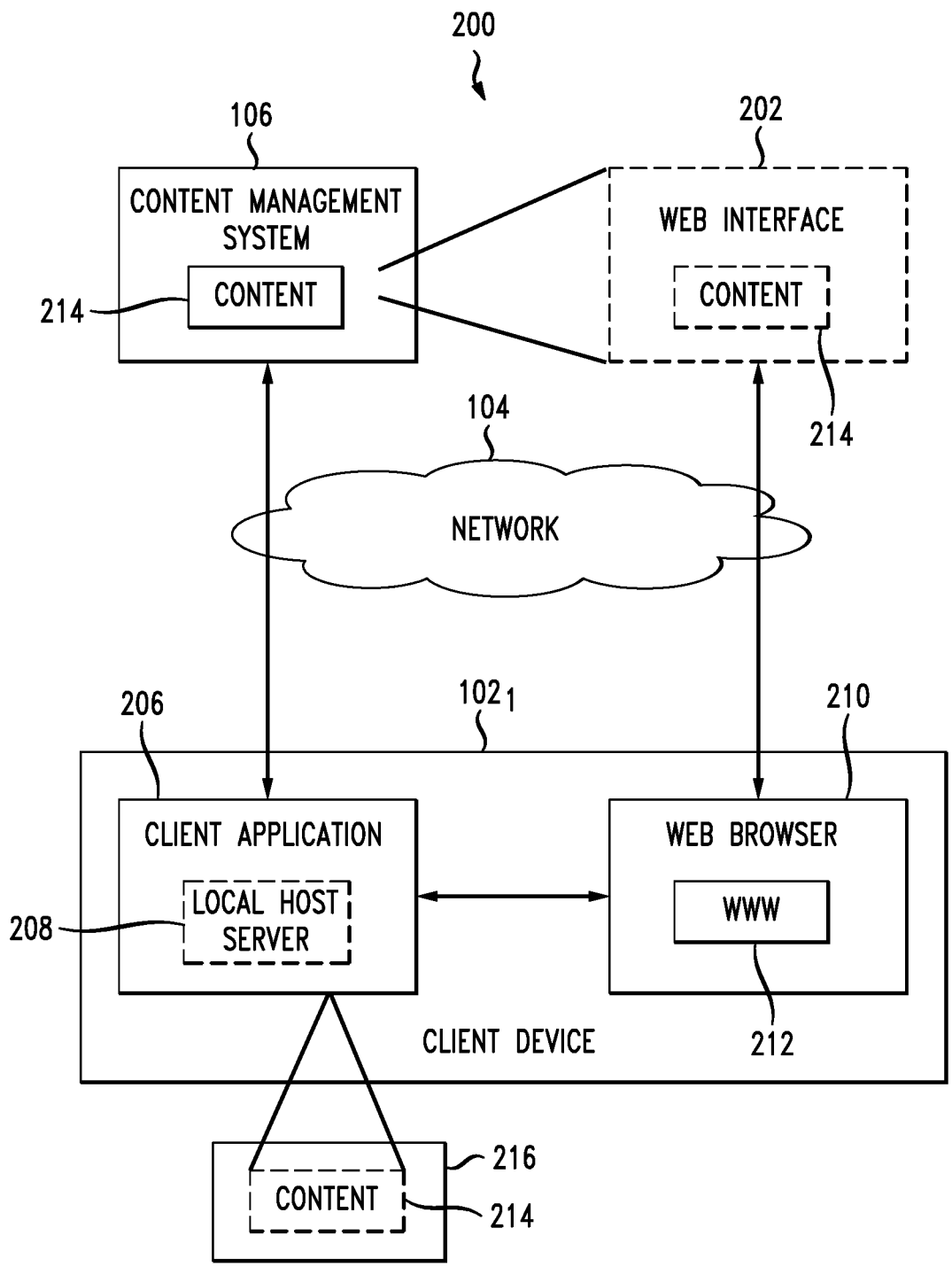
FIG. 2 shows a block diagram of an example environment for implementing various embodiments of the present technology.

FIG. 2 shows a block diagram of an example environment 200 for implementing various embodiments of the present technology. Client device $102_1$ can communicate with content management system 106, via network 104, to perform a login process, access content 214, and/or interact with content management system 106 and web interface 202. Web interface 202 can be a website associated with content management system 106. Web interface 202 can be hosted and managed by user interface module 122 on content management system 106.

Content management system 106 can maintain content 214 for users to access via client devices 102. Content 214 can include media files (e.g., photos, videos, audio, documents, and the like), links, profiles, webpages, and any other data. For example, content 214 can include webpage content provided by web interface 202, data associated with one or more user accounts registered at content management system 106, user account information (e.g., account details, profiles, account content, etc.), etc.

Client device $102_1$ can login with content management system 106 using a user account registered with content management system 106, and/or access account content 214 on content management system 106. Content management system 106 can maintain one or more registered user accounts, which can be tied to individual users, clients, members, or subscribers that use services provided by content management system 106. User accounts can include information about respective users' profiles, credentials, synchronized data, membership information, etc. For example, content management system 106 can maintain user profiles (e.g., name, address, email address, phone number, user preferences, etc.), login credentials (e.g., username, password, security questions, cryptographic keys, etc.), synchronized data (e.g., files, folders, documents, etc.), membership information (e.g., date joined, membership tier, subscription status, billing information, standing, etc.), device information (e.g., client device identifiers, client device addresses, associated software applications, etc.), and so forth.

Client device $102_1$ can have client application 206 (also called, "client-side application," "desktop application," "mobile application," etc.) installed and running on client device $102_1$. Client application 206 can run on the client device's operating system (OS). For example, if client device $102_1$ runs a WINDOWS OS, client application 206 can be a WINDOWS application. In another example, if client device $102_1$ is mobile smartphone running iOS, client application 206 can be an iOS application. Users can download client application 206 from a website (such as a website from web interface 202) or an application marketplace, and install it on client device $102_1$.

Client application 206 can provide an interface for the user of client device $102_1$ to access content 214 on content management system 106, interact with content management system 106, and synchronize content 214 between content management system 106 and client device $102_1$. For example, client application 206 can provide an interface for user(s) at client device $102_1$ to register an account with content management system 106; login with the registered account to content management system 106; create and access content (e.g., content 214) on content management system 106; upload content (e.g., content 214) to, and download content (e.g., content 214) from, content management system 106; synchronize data (e.g., content 214) with content management system 106; etc.

Client application 206 can also provide an interface for users to access and/or modify data and content on client device $102_1$. For example, client device $102_1$ can include content library 216, which can be accessed via client application 206. Content library 216 can include items from content 214 in content management system 106. Content library 216 can also include other content items, such as local files, links, documents, resources, or data. Client application 206 can interact with content library 216 to add, edit, delete, configure, or manage any portion of content library 216. Client application 206 can thus provide an interface for users to access content library 216 and content 214 on client device $102_1$. Client application 206 can also allow users to synchronize any portion of content library 216 and/or content 214 with content management system 106. Client application 206 can also allow users to view, modify, and delete any portion of content 214 on content management system 106, and/or synchronize any portion of content 214 from client device $102_1$ to content management system 106 and vice versa.

Client application 206 may include local host server 208 (e.g., a local web server). Local host server 208 can be part of client application 206, or can be a separate entity that exists outside client application 206. Local host server 208 can run web server software at client device $102_1$. Accordingly, client application 206 can, for example, host a local website (e.g., www.localhost.com) at client device $102_1$ through local host server 208. Moreover, local host server 208 can generate and/or service dynamic and static web documents to clients and/or applications. In some cases, a local website hosted by local host server 208 can be associated with a network address or domain (e.g., public address and domain name) for access by other devices and/or applications residing on remote devices.

Client device $102_1$ can also have browser application 210 installed and running on it. Browser application 210 allows a user to access web content (e.g., content 214) by fetching and rendering web documents according to various protocols and standards (e.g., web protocols, communication protocols, scripting language standards, content formats, content rendering standards, etc.). Moreover, browser application 210 can navigate and access documents on web interface 202. For example, browser application 210 can access website 212 through web interface 202, and render web pages from website 212 through browser application 210. Website 212 can include content 214 from content management system 106, and any other web content or features.

Browser application 210 may also access local content on client device $102_1$. For example, browser application 210 may access content from content library 216 and/or content associated with client application 206. Browser application 210 can also communicate with client application 206 and/or local host server 208 on client device $102_1$. For example, browser application 210 can establish a local communication channel to client application 206 and/or local host server 208 to exchange communications with client application $102_1$ and/or local host server 208. Browser application 210 can also establish a communication channel with web interface 202 and client application 206 through content management system 106, as further explained below with reference to FIG. 3.

Figure 3:
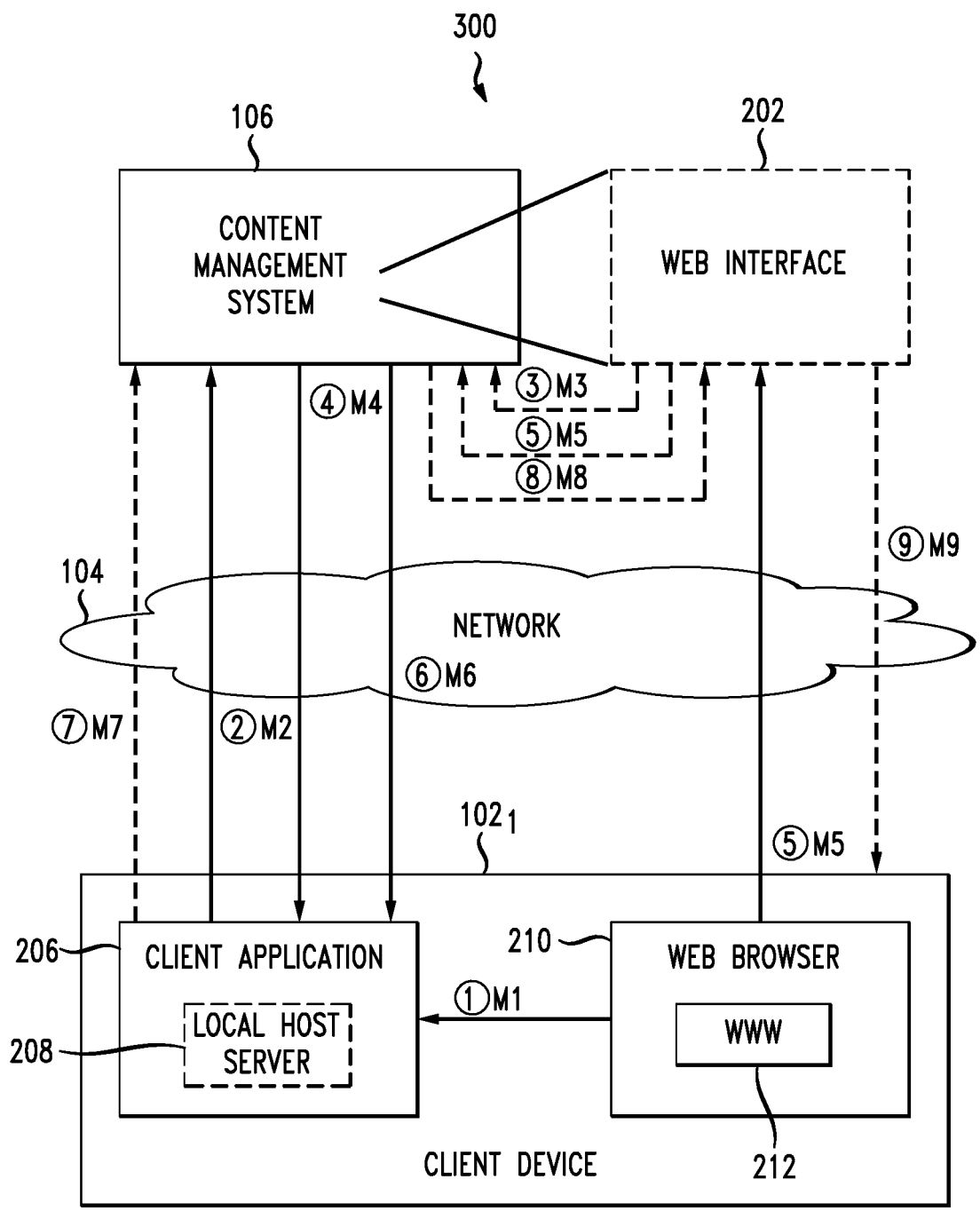
FIG. 3 shows a block diagram of an example communications system for implementing various embodiments of the present technology.

FIG. 3 shows a block diagram of an example communications system 300 for implementing various embodiments of the present technology. Communications system 300 can provide a mechanism for communications between various elements of content management system 106 and client device $102_1$ in environment 200. For example, communications system 300 can provide a mechanism for client application 206 to communicate with web interface 202 and/or browser application 210, and vice versa, via content management system 106.

For example, browser application 210 can send a message $M_1$ to client application 206. Browser application 210 can send message $M_1$ to client application 206 in a variety of different ways. For example, browser application 210 can send message $M_1$ to client application 206 and/or local host server 208 through a secure session request (e.g., SSL session request). As another example, browser application 210 can send message $M_1$ to client application 206 and/or local host server 208 through an OS message or command.

Message $M_1$ can include a unique identifier or nonce, associated with web interface 202 and/or browser application 210. For example, message $M_1$ can include an identifier which uniquely identifies browser application 210 to web interface 202 and/or content management system 106. As another example, message $M_1$ can include an identifier that uniquely identifies a browser session between browser application 210 and web interface 202 to web interface 202 and/or content management system 106. The unique identifier can be passed within message $M_1$ as part of a request (e.g., secure session request), command, string, domain name or URL, etc. For example, the unique identifier can be passed within a fully qualified domain name (FQDN) included in message $M_1$.

The unique identifier can be generated by browser application 210, web interface 202, or content management system 106. For example, the unique identifier can be generated by web interface 202 or content management system 106 to uniquely identify browser application 210 and/or a session between browser application 210 and web interface 202. As another example, the unique identifier can be generated by browser application 210 to uniquely identify browser application 210.

Client application 206 can receive message $M_1$ from browser application 210 and extract or identify the unique identifier in message $M_1$. For example, browser application 210 can send a secure session request to client application 206 or local host server 208, including message $M_1$. Client application 206 can then extract the unique identifier from the secure session request. In some cases, client application 206 can also respond to the secure session request. For example, client application 206 can extract the unique identifier but fail the connection requested in the secure session request.

Client application 206 can then send message $M_2$ to content management system 106. $M_2$ can include the unique identifier from $M_1$. Message $M_2$ can also provide an indication to content management system 106 that client application 206 is expecting a message from web interface 202 and/or browser application 210. For example, message $M_2$ can include data, such as metadata, identifying a type of information that client application 206 is expecting, a source or session associated with the message that client application 206 is expecting, etc. As another example, message $M_2$ can include an instruction for content management system 106 to forward to the client application 206 any messages received by the content management system 106 that include, or are associated with, the unique identifier. To illustrate, message $M_2$ can include a request for content management system 106 to forward to client application 106 any messages that content management system 106 receives which include a reference or association to the unique identifier. As yet another example, the message $M_2$ can itself represent to content management system 106 an indication that client application 206 is expecting one or more messages from web interface 202 and/or browser application 210.

Content management system 106 can receive message $M_2$ from client application 206 and extract or identify the unique identifier in the message. As previously mentioned, the unique identifier can be based on, or associated with, browser application 210 and/or a session between browser application 210 and web interface 202. Thus, when content management system 106 receives the unique identifier from message $M_2$, it can use the unique identifier to associate client application 206 with browser application 210 and/or a session between browser application 210 and web interface 202. Based on the unique identifier, content management system 106 can map or associate client application 206 with browser application 210 and any sessions between browser application 210 and web interface 202. This mapping or association can be used by content management system 106 to relay communications between client application 206 and browser application 210 and/or web interface 202, as further explained below.

In addition, content management system 106 can receive message $M_2$ and maintain the connection or communication channel between content management system 106 and client application 206 open/accessible, or otherwise establish a new connection or channel between content management system 106 and client application 206. Content management system 106 can maintain establish such a connection or communication channel based on the unique identifier in message $M_2$ and/or an indication in message $M_2$ that client application 206 is expecting a message from browser application 210 and/or web interface 202.

Content management system 106 can then forward any messages from browser application 210 and/or web interface 202 to client application 206. For example, content management system 106 can receive message $M_3$ from web interface 202. Message $M_3$ can include the unique identifier and any message content. Content management system 106 can match the unique identifier in messages $M_2$ and $M_3$, and determine that the content of message $M_3$ can be relayed to client application 206. Content management system 106 can then send message $M_4$ to client application 206, which can be a forwarded copy of message $M_3$ or a new message including any portion of the content of message $M_3$.

As another example, browser application 210 can send message $M_5$ to web interface 202. Message $M_5$ can include the unique identifier as well as any content intended for client application 206. Web interface 202 can receive message $M_5$ and forward it (or any portion thereof) to content management system 106. Content management system 106 can receive message $M_5$ and extract or identify the unique identifier in the message. Content management system 106 can then determine that message $M_5$ can be relayed or forwarded to client application 206. For example, content management system 106 can match the unique identifier in message $M_5$ with the unique identifier in message $M_2$ from client application 206, to determine that client application 206 is associated with the unique identifier and can receive communications associated with the unique identifier.

Content management system 106 can then send message $M_6$ to client application 206. Message $M_6$ can be a forwarded copy of message $M_5$ or a new message including any portion of message $M_5$. Client application 206 can then receive message $M_6$ from content management system 106.

Client application 206 can also send a message $M_7$ to web interface 202 and/or browser application 210 through content management system 106. Message $M_7$ can include the unique identifier and any message content. Content management system 106 can receive message $M_7$ from client application 206 and extract or identify the unique identifier in the message. Content management system 106 can match the unique identifier with browser application 210 and/or a session between browser application 210 and web interface 202, to determine that message $M_7$ can be forwarded to browser application 210 and/or web interface 202. Content management system 106 can match the unique identifier with browser application 210 and/or a session between browser application 210 and web interface 202 based a respective, matching identifier associated with browser application 210 and/or the session between browser application 210 and web interface 202.

Based on the match, content management system 106 can send message Mg, including any portion of the message content of message $M_7$, to web interface 202. Web interface 202 can then extract and/or process any content of message Mg. If message $M_7$ is intended for browser application 210, web interface 202 can send message $M_9$, which can be a forwarded copy of message $M_7$ or a new message including any portion of the message $M_7$, to browser application 210.

In this way, client application 206 can exchange communications with browser application 210 and/or web interface 202 through content management system 106. Content management system 106 can use the unique identifier to relay messages between client application 206 and browser application 210 or web interface 202. In particular, content management system 106 can use the unique identifier to identify the appropriate target recipients of messages to be relayed by content management system 106.

Content management system 106 can also use the unique identifier to distinguish between different client applications, web sessions, and/or browser applications when relaying messages or communications. For example, if several client and browser applications on several client devices 102 are authenticated or registered with content management system 106 using a same account, content management system 106 can use unique identifiers to identify which specific client application or browser application should receive a message. To illustrate, content management system 106 can determine that a message from web interface 202 should be relayed to client application 206, as opposed to another client application authenticated or registered with content management system through the same account, by associating the unique identifier received in the message from web interface 202 with the unique identifier received from client application 206.

Communications protocol 300 can also help content management system 106 avoid certain security problems, such as spoofing, when communicating messages to client application 206 and browser application 210. For example, say user A logs into content management system 106 using a client application at client device A. User A later leaves client device A and uses a client application at client device B to access content on content management system 106. User A also establishes a session with web interface 202 using a browser application at client device B. If content management system 106 receives a message from the browser application at client device B and forwards the message to the client application at client device A, the message may reach an unintended user who now has access to client device A. Moreover, content management system 106 may not know which of the client applications should receive the message from the browser application at client device B.

With communications protocol 300, content management system 106 can associate the client application at client device B with the browser application at the client device B based on the unique identifier. Thus, when content management system 106 receives a message including a unique identifier from the browser application at client device B, it can determine that the message should be relayed to the client application which reported the same unique identifier (e.g., client application at client device B). Accordingly, content management system 106 can determine that the client application at client device B has reported the same unique identifier, and select the client application at client device B, as opposed to any other client application at any other device, to receive the message from the browser application at client device B.

As a security measure, content management system 106 (and/or client device $102_1$) can also check that the process of client application 206 and the process of browser application 210 at client device $102_1$ are associated with, or owned by, the same OS user. For example, before relaying a message between client application 206 and browser application 210, content management system 106 can verify that client application 206 and browser application 210 are running at client device $102_1$ under the same OS username. This way, content management system 106 can increase the likelihood that client application 206 and browser application 210 are running on the same device and any corresponding messages are being received by content management system 106 from the same device. Accordingly, content management system 106 can identify security issues, such as spoofing attempts, and flag or filter messages accordingly using information about the processes and usernames running the client and browser applications.

Figure 4:
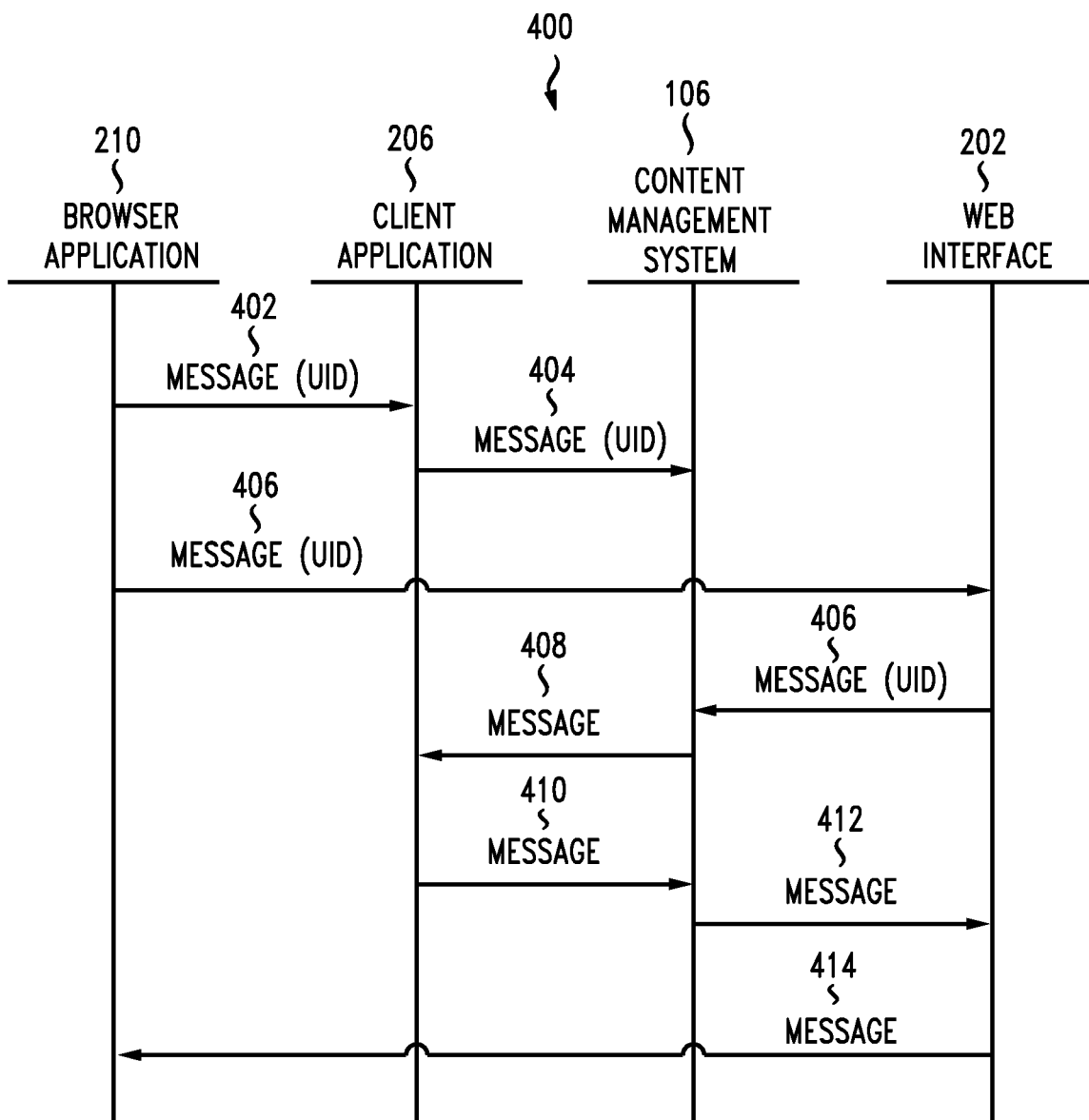
FIG. 4 shows a diagram of example communications according to an example communications protocol.

FIG. 4 shows a diagram of example communications 400 according to an example communications protocol. Browser application 210 can send message 402 to client application 206. Message 402 can include a unique identifier or nonce. The unique identifier in message 402 can be associated with browser application 210 and/or a session between browser application 210 and web interface 202.

Message 402 can be sent by browser application 210 as any type of communication and/or based on any communications protocol that can enable browser application 210 to communicate with client application 206. For example, message 402 can be a session request, such as a secure SSL session request, from browser application 210 to client application 206. Such session request can include the unique identifier as part of the request. For example, the session request can include the unique identifier as a URL or a domain and/or subdomain in the URL. Client application 206 can extract or identify the unique identifier within message 402. For example, if browser application 210 sends the unique identifier within a secure session request, client application 206 can identify or extract the unique identifier from the request even if client application 206 is not capable of establishing or supporting a secure session, such as an SSL session, between client application 206 and browser application 210.

After identifying or extracting the unique identifier from message 402, client application 206 can send message 404 to content management system 106. Message 404 can include the unique identifier from message 402. Message 404 can include an indication from client application 206 to content management system 106 that client application 206 expects to receive from content management system 106 one or more messages originating from browser application 210 and/or web interface 202. Message 404 can also request content management system 106 to maintain or keep open an existing communication channel between client application 206 and content management system 106, or create or open a new communication channel between client application 206 and content management system 106, for use by content management system 106 to send any messages to client application 206 from browser application 210 and/or web interface 202.

Content management system 106 can receive message 404 and identify or extract the unique identifier from the message. Content management system 106 can use the unique identifier to associate client application 206 with browser application 210, web interface 202, and/or a session between browser application 210 and web interface 202. Content management system 106 can also use the unique identifier to associate any current or future messages from browser application 210 and/or web interface 202 with client application 206. This can allow content management system 106 to identify client application 206 as the target of messages or content to be forwarded from browser application 210 and/or web interface 202.

For example, content management system 106 may be aware of, and/or receive messages from, various client applications and/or browser applications. Some of the various client applications and browser applications may even be associated with a same user account or communication session. Thus, content management system 106 can use the unique identifier to determine which of the various client applications should receive messages or communications forwarded by content management system 106 from a specific browser application and/or web interface 202, and vice versa.

Based on message 404, content management system 106 can also determine that client application 206 is expecting one or more messages from browser application 210 and/or web interface 202. Content management system 106 can maintain an existing communication channel with client application 206 and/or create a new communication channel with client application 206, which content management system 106 can use to forward or send any messages from browser application 210 and/or web interface 202 intended for client application 206.

Content management system 106 can receive message 406 from web interface 202. Message 406 can originate from web interface 202 or browser application 210. For example, message 406 can be sent from browser application 210 to web interface 202, and from web interface 202 to content management system 106. Alternatively, message 406 can originate from web interface 202. Here, message 406 can be sent from web interface 202 to content management system 106.

Message 406 can include the unique identifier from messages 402 and 404. Knowing that content management system 106 received the unique identifier from client application 206 through message 404, content management system 106 can use the unique identifier to associate message 406 with client application 206. This way, content management system 106 can determine that message 406 or any content thereof should be sent or forwarded to client application 206.

Message 406 can include content and/or metadata intended for client application 206. For example, message 406 can include one or more packets for client application 206. As previously explained, based on the unique identifier, content management system 106 can determine that message 406 and/or any content thereof can be sent or forwarded to client application 206. Accordingly, content management system 106 can send message 408, which can be a forwarded copy of message 406 or a new message including at least a portion of message 406, to client application 206. In some cases, message 408 can also include the unique identifier.

Client application 206 can receive message 408 from content management system 106 and process the message accordingly. Client application 206 can also send message 410 to content management system 106. Message 410 can be a message intended for web interface 202 and/or browser application 210. For example, message 410 can be a reply to message 408 and/or a new request or communication for web interface 202 and/or browser application 210.

Content management system 106 can receive message 410 and associate message 410 with browser application 210 and/or web interface 202. Content management system 106 can make this association based on the unique identifier, which can be included in message 410 or attributed to message 410 based on a prior association of the unique identifier with client application 206 (e.g., from message 404 previously received by content management system 106 from client application 206). Such association can be used by content management system 106 to determine that message 410, or the content thereof, should be sent or forwarded to web interface 202 and/or browser application 210.

Content management system 106 can then send message 412 to web interface 202. Message 412 can be a forwarded copy of message 410 or a new message including at least a portion of message 410.

Web interface 202 can receive message 412 and associate message 412 with browser application 210 and/or a session between browser application 210 and web interface 202. Web interface 202 can associate message 412 with browser application 210 and/or a session between browser application 210 and web interface 202 based on the unique identifier, which can be included in message 412 and/or a previous message from client application 210.

If web interface 202 associates message 412 with browser application 210, it can send message 414, which can be a forwarded copy of message 412 or a new message including at least a portion of message 412, to browser application 210.

If in addition or alternatively, web interface 202 associates message 412 with a session between browser application 210 and web interface 202, web interface 202 can process message 412 for the session. For example, web interface 202 can attribute message 412 to the session and associate any content or instructions in message 412 with the session. Web interface 202 can also apply any content or instructions to the session based on message 412.

In the above example, content management system 106 can use the unique identifier in message 402 to exchange or relay communications between client application 206 and web interface 202/browser application 210. Content management system 106 can use the same unique identifier for multiple exchanges or communications between client application 206 and web interface 202/browser application 210. However, content management system 106 can also use different unique identifiers for different exchanges or communications.

For example, browser application 210 can send a new message (not shown) containing a different unique identifier to client application 206. Client application 206 can then send the different unique identifier to content management system 106. Content management system 106 can then associate the different unique identifier with other messages received from web interface 202 and/or browser application 210 that also contain the different unique identifier. Content management system 106 can then send or relay messages between client application 206 and browser application 210/web interface 202 based on the different unique identifier.

In some cases, new or different unique identifiers can be used for different communications based on a threshold period of time or communications. For example, browser application 210 can send an updated or new unique identifier to client application 206 after a specific number of exchanges (e.g., 1, 2, ..., N) and/or a predetermined period of time (e.g., 1 hour, 1 day, 1 week, etc.), for use in a subsequent exchange(s) or communication(s).

Figure 5:
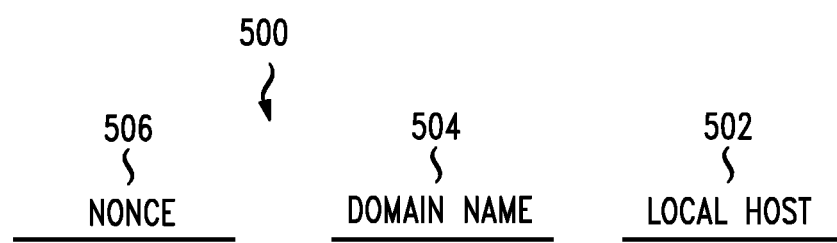
FIG. 5 shows an example format of a unique identifier for implementing various embodiments of the present technology.

FIG. 5 shows an example format 500 of a unique identifier for implementing various embodiments of the present technology. Format 500 can include fields 502-506. Fields 502-506 can be part of a domain name or URL, for example.

Field 502 can be a top-level domain, such as localhost for example. Field 504 can be a second-level domain. For example, field 504 can be a second-level domain associated with a website or server (e.g., website associated with content management system 106 and/or web interface 202).

Field 506 can be a subdomain field. Moreover, field 506 can include or represent a nonce or unique identifier. For example, field 506 can be a nonce or unique identifier added to a subdomain field represented by field 506. The nonce or unique identifier can be associated with a browser application (e.g., browser application 210) and/or a website (e.g., website associated with content management system 106 and/or web interface 202).

Format 500 can be used to pass a nonce or unique identifier within a message, such as a secure session request. The nonce or unique identifier can then be extracted or identified by the recipient (e.g., client application 206) based on format 500.

While field 506 is described as including or representing a nonce or unique identifier, other fields can be part of, include, and/or represent, the nonce or unique identifier. For example, the nonce or unique identifier can be represented by all of fields 502-506, any individual field from fields 502-506, or any combination of fields 502-506.

Moreover, in the above example, fields 502-506 in format 500 are non-limiting examples of possible fields provided for the sake of simplicity and explanation purposes. As one of ordinary skill in the art will readily understand, format 500 can include more or less fields than shown in FIG. 5.

Figure 6:
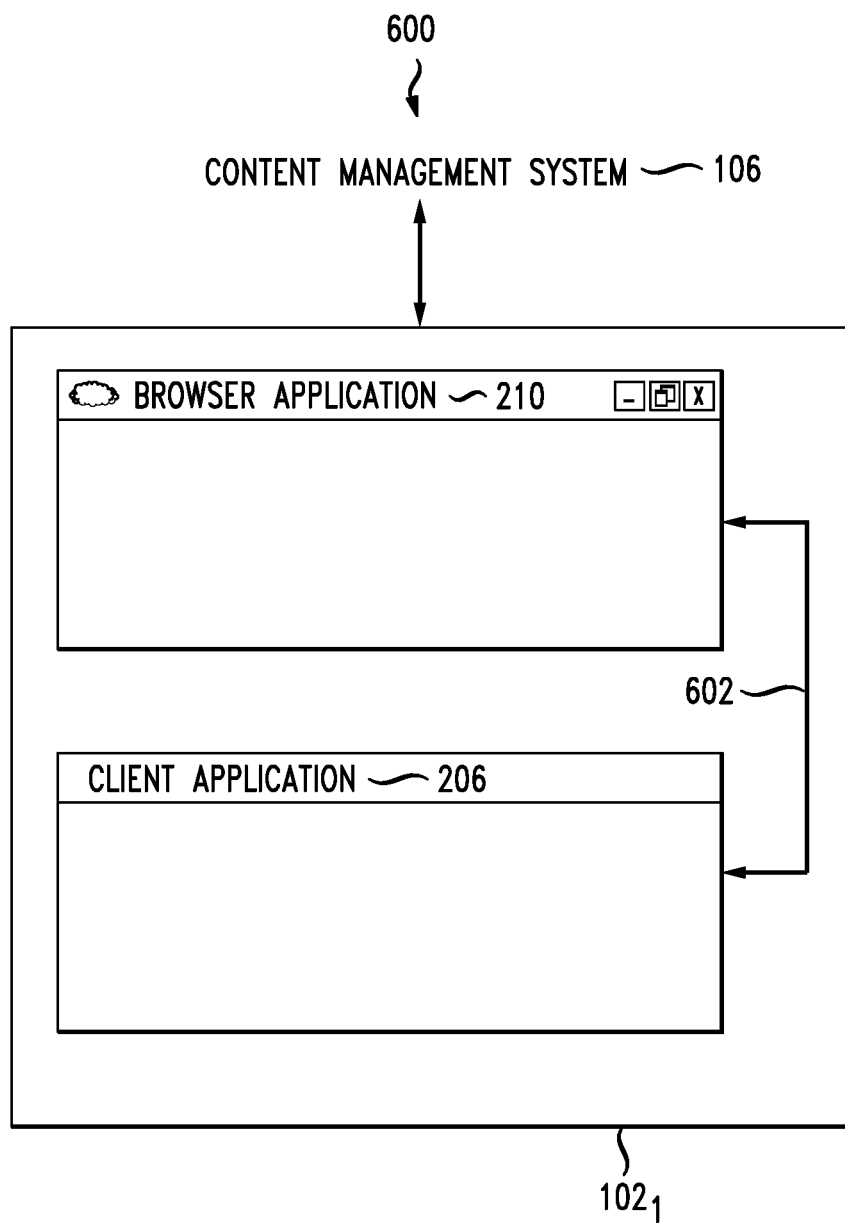
FIG. 6 shows a schematic diagram of an example interaction between applications in accordance with various embodiments of the present technology.

FIG. 6 shows a schematic diagram of an example interaction 600 between applications in accordance with various embodiments of the present technology. Interaction 600 can be based on communications protocol 300 shown in FIG. 3, for example. Moreover, interaction 600 can exchanges 602 between client application 206 and browser application 210 at client device $102_1$. Exchanges 602 can include one or more exchanges, communications, and/or interactions between client application 206 and browser application 210.

Exchanges 602 can be facilitated by content management system 106 as previously described with reference to FIGS. 3 and 4. Moreover, exchanges 602 can enable client application 206 and browser application 210 to share or exchange messages, content, settings, sessions, commands, or any information. For example, exchanges 602 can enable client application 206 and browser application 210 to share session information, account information, security information, content, etc.

Exchanges 602 can enable client application 206 and browser application 210 to access respective data from each other. For example, exchanges 602 can enable browser application 210 to access or display content on client application 206 or otherwise accessible to client application 206, and vice versa.

Figure 7A:
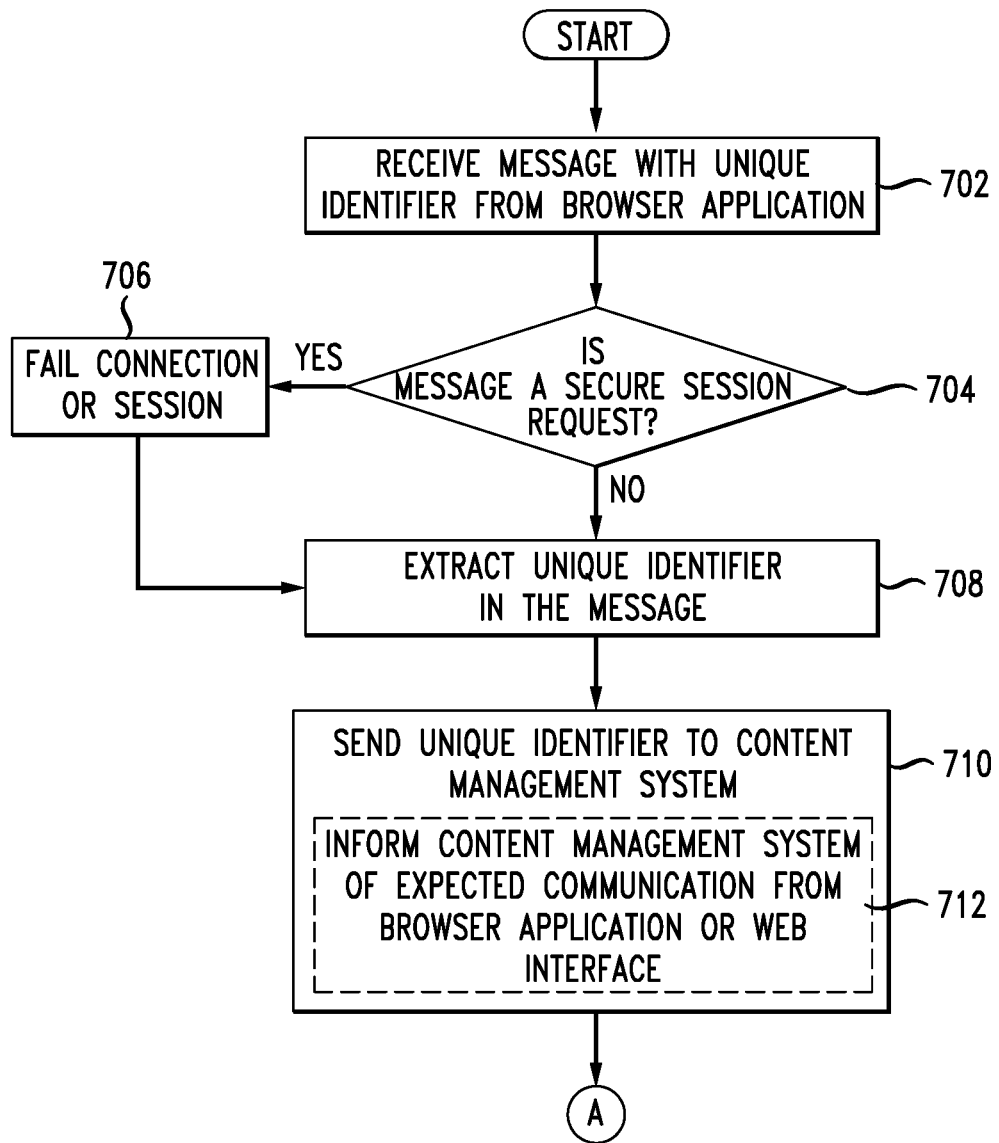
FIGS. 7A and 7B show flowcharts of example method embodiments for implementing various embodiments of the present technology.
Figure 7B:
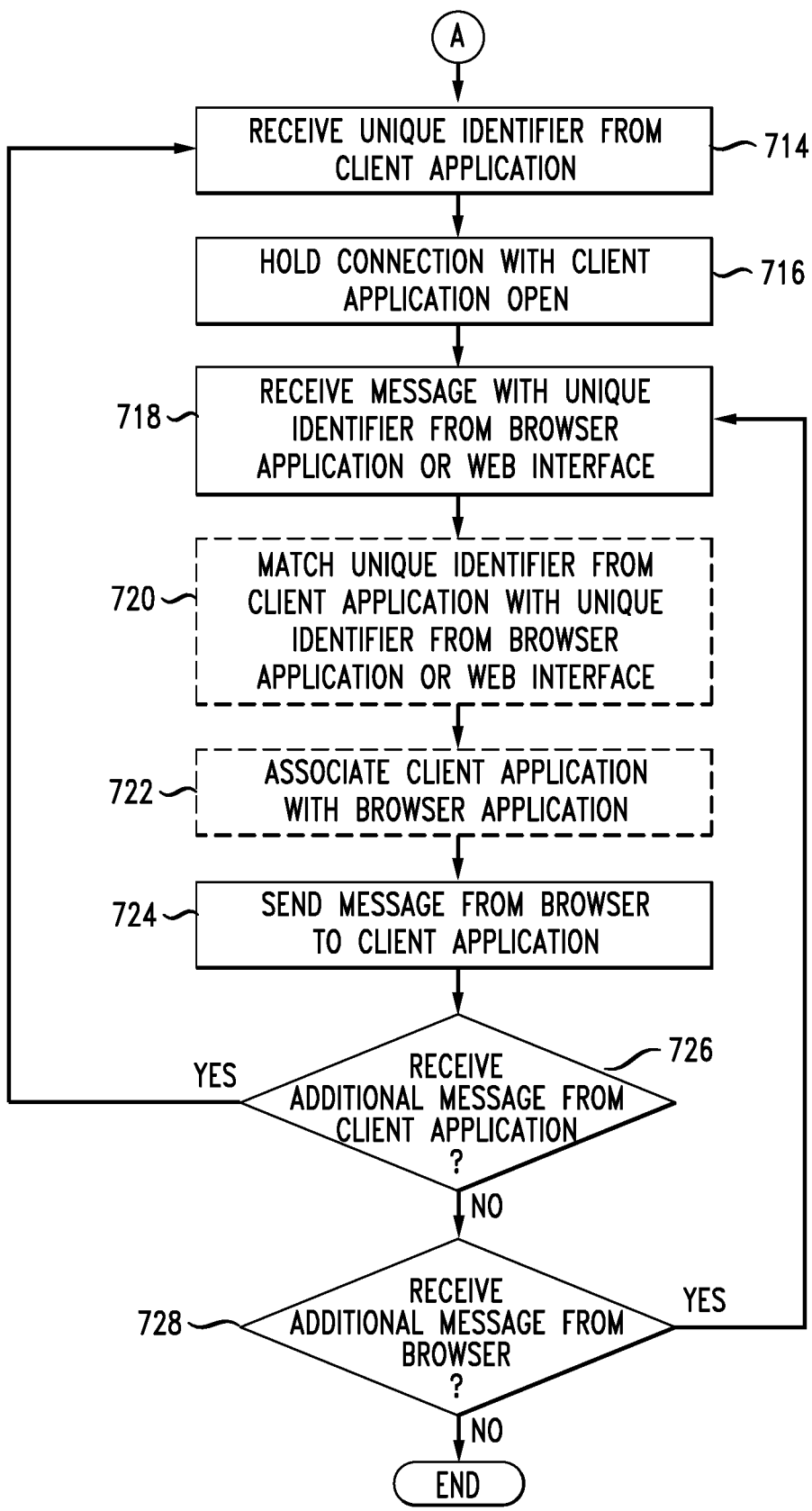
Figure 8:
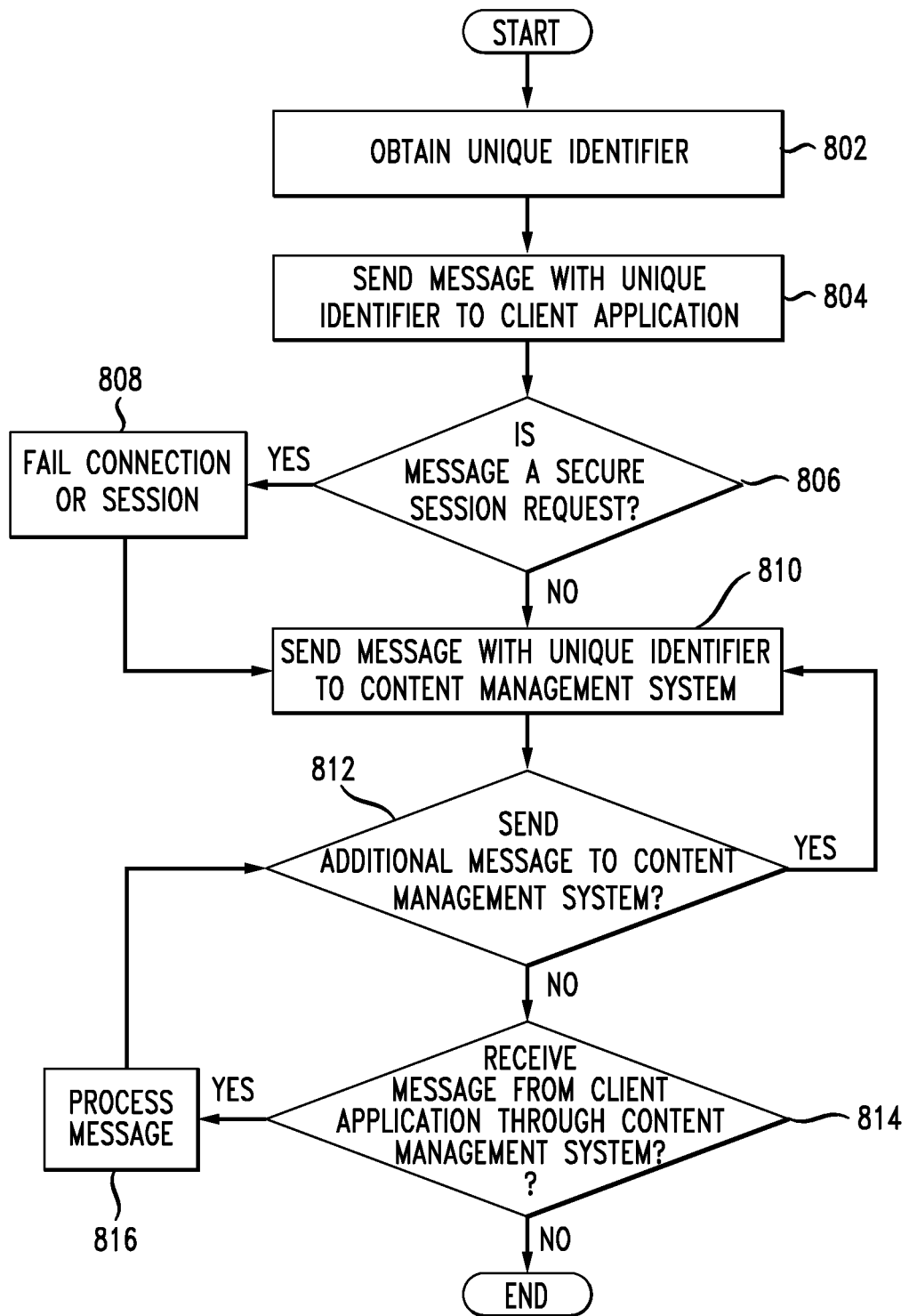
FIG. 8 shows a flowchart of an example method embodiment for implementing various embodiments of the present technology.

The disclosure now turns to the example method embodiments shown in FIGS. 7A-B and 8. For the sake of clarity, the methods are described in terms of content management system 106, client application 206, browser application 210, and web interface 202, as shown in FIGS. 1-4, configured to practice the methods. The steps outlined herein are exemplary and can be implemented in any combination thereof, including combinations that exclude, add, or modify certain steps.

FIGS. 7A and 7B show flowcharts of example method embodiments for implementing various embodiments of the present technology. Referring to FIG. 7A, at step 702, client application 206 can receive a message with a unique identifier from browser application 210. At step 704, client application 206 can determine if the message is a secure session request from browser application 210. If the message is a secure session request, at step 706, client application 206 can fail the connection or session requested, and proceed to step 708. If the message is not a secure session request, client application 206 can proceed directly to step 708.

At step 708, client application 206 can extract the unique identifier in the message.

At step 710, client application 206 can send the unique identifier to content management system 106. Moreover, at step 712, client application 206 can inform content management system 106 of an expected communication from browser application 210 and/or web interface 202.

Referring to FIG. 7B, at step 714, content management system 106 can receive the unique identifier from client application 206.

At step 716, content management system 106 can hold connection with client application 206 open or establish a new connection.

At step 718, content management system 106 can receive a message with the unique identifier from browser application 210 or web interface 202.

At step 720, content management system 106 can match the unique identifier received from client application 206 at step 714 with the unique identifier received from browser application 210 or web interface 202 at step 718.

At step 722, content management system 106 can associate client application 206 with browser application 210 based on a match of the unique identifiers. Here, content management system 106 can associate client application 206 with browser application 210 and/or a session associated with browser application 210 (e.g., session between browser application 210 and web interface 202). The association can allow content management system 106 to relay or route communications between client application 206 and browser application 210 and/or web interface 202.

At step 724, content management system 106 can send the message (or content thereof) from browser application 210 or web interface 202 to client application 206.

At step 726, content management system 106 can determine if additional messages have been received from client application 206. If content management system 106 determines that an additional message has been received from client application 206, content management system 106 can proceed to step 714. Alternatively, content management system 106 can proceed directly to step 724 based on the results from the previous matching and association in steps 720 and 722.

If content management system 106 determines that an additional message has been received from client application 206, content management system 106 can proceed to step 714. Alternatively, content management system 106 can proceed directly to step 724 based on the results from the previous matching and association in steps 720 and 722.

FIG. 8 shows a flowchart of another example method embodiment for implementing various embodiments of the present technology. At step 802, browser application 210 can obtain a unique identifier. The unique identifier can be associated with browser application 210 and/or a session between browser application 210 and web interface 202. The unique identifier can be generated by browser application 210, web interface 202, or content management system 106, specifically for browser application 210.

At step 804, browser application 210 can send a message with the unique identifier to client application 206. The message can be a communication, signal, request, etc. At step 806, if the message is a secure session request, browser application 210 can proceed at step 808 to fail the connection or session requested. Browser application 210 can fail the connection or session, for example, if client application 206 is not capable of establishing or supporting the secure session requested. However, even if client application 206 cannot establish the secure session, it can extract the unique identifier from the request as previously described with reference to FIG. 7A.

At step 810, browser application can send a message with the unique identifier to content management system 106. The message can include message content in addition to the unique identifier. For example, the message can include one or more instructions, notifications, requests, commands, data, packets, alerts, etc.

The unique identifier in the message sent to content management system 106 can allow content management system 106 to associate the message or its content with another application associated with that same unique identifier (e.g., client application 206), as previously explained. Thus, browser application 210 can use the unique identifier to direct associated communications to a specific client application (e.g., client application 206).

At step 812, browser application 210 can determine whether to send any additional messages to content management system 106 for delivery to client application 210. If browser application 210 has additional messages, it can proceed back to step 810 to send the additional message(s). If browser application 210 does not have any additional messages, it can proceed to step 814 to determine whether it has received a message from client application 210 delivered by content management system 106. If so, at step 816, browser application 210 can process the message and proceed back to step 812.

Figure 9A:
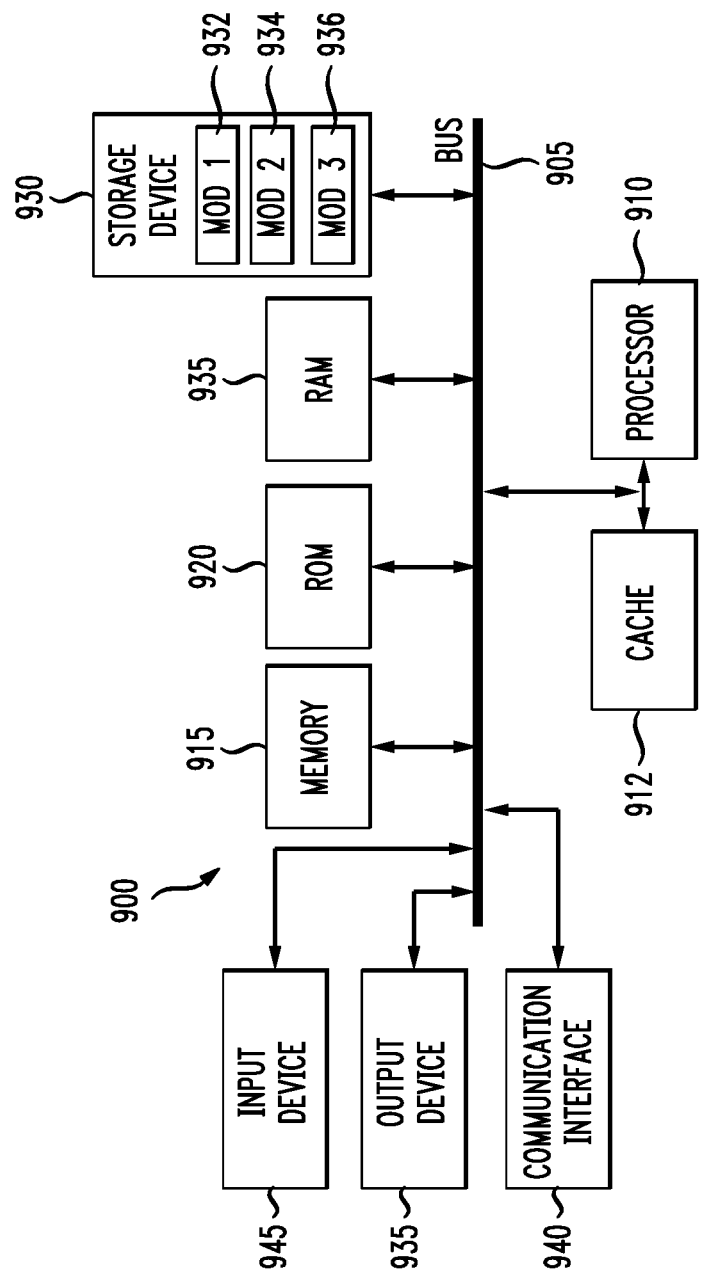
FIGS. 9A and 9B show example system embodiments for implementing various embodiments of the present technology.
Figure 9B:
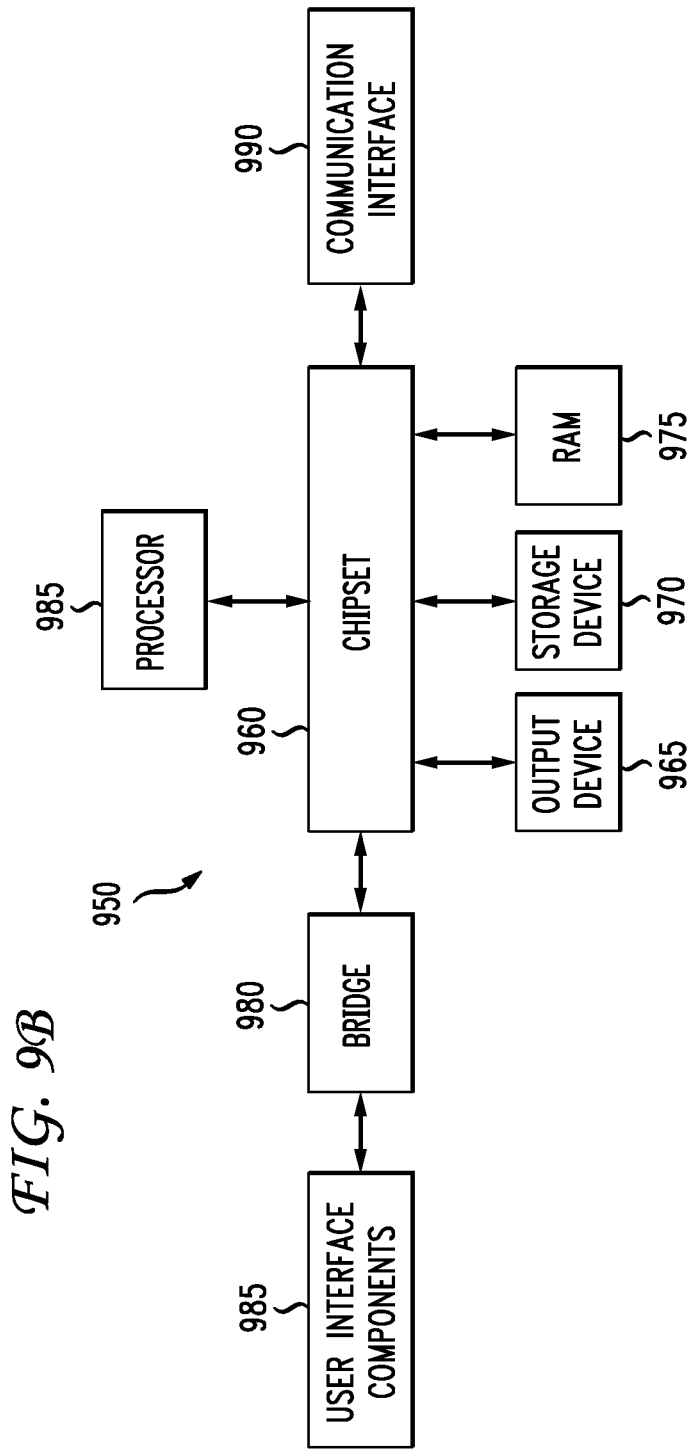

FIG. 9A and FIG. 9B show example system embodiments. The more appropriate embodiment will be apparent to those of ordinary skill in the art when practicing the present technology. Persons of ordinary skill in the art will also readily appreciate that other system embodiments are possible.

FIG. 9A illustrates a conventional system bus computing system architecture 900 wherein the components of the system are in electrical communication with each other using a bus 905. Exemplary system 900 includes a processing unit (CPU or processor) 910 and a system bus 905 that couples various system components including the system memory 915, such as read only memory (ROM) 920 and random access memory (RAM) 925, to the processor 910. The system 900 can include a cache of high-speed memory connected directly with, in close proximity to, or integrated as part of the processor 910. The system 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other system memory 915 may be available for use as well. The memory 915 can include multiple different types of memory with different performance characteristics. The processor 910 can include any general purpose processor and a hardware module or software module, such as module 1 932, module 2 934, and module 3 936 stored in storage device 930, configured to control the processor 910 as well as a special-purpose processor where software instructions are incorporated into the actual processor design. The processor 910 may essentially be a completely self-contained computing system, containing multiple cores or processors, a bus, memory controller, cache, etc. A multi-core processor may be symmetric or asymmetric.

To enable user interaction with the computing device 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art. In some instances, multimodal systems can enable a user to provide multiple types of input to communicate with the computing device 900. The communications interface 940 can generally govern and manage the user input and system output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof.

The storage device 930 can include software modules 932, 934, 936 for controlling the processor 910. Other hardware or software modules are contemplated. The storage device 930 can be connected to the system bus 905. In one aspect, a hardware module that performs a particular function can include the software component stored in a computer-readable medium in connection with the necessary hardware components, such as the processor 910, bus 905, display 935, and so forth, to carry out the function.

FIG. 9B illustrates a computer system 950 having a chipset architecture that can be used in executing the described method and generating and displaying a graphical user interface (GUI). Computer system 950 is an example of computer hardware, software, and firmware that can be used to implement the disclosed technology. System 950 can include a processor 955, representative of any number of physically and/or logically distinct resources capable of executing software, firmware, and hardware configured to perform identified computations. Processor 955 can communicate with a chipset 960 that can control input to and output from processor 955. In this example, chipset 960 outputs information to output 965, such as a display, and can read and write information to storage device 970, which can include magnetic media, and solid state media, for example. Chipset 960 can also read data from and write data to RAM 975. A bridge 980 for interfacing with a variety of user interface components 985 can be provided for interfacing with chipset 960. Such user interface components 985 can include a keyboard, a microphone, touch detection and processing circuitry, a pointing device, such as a mouse, and so on. In general, inputs to system 950 can come from any of a variety of sources, machine generated and/or human generated.

Chipset 960 can also interface with one or more communication interfaces 990 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 955 analyzing data stored in storage 970 or 975. Further, the machine can receive inputs from a user via user interface components 985 and execute appropriate functions, such as browsing functions by interpreting these inputs using processor 955.

It can be appreciated that exemplary systems 900 and 950 can have more than one processor 910 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim. For example, claim language reciting "at least one of A or B" indicates that either a set of A or B (e.g., A only or B only) or a set of A and B (e.g., both A and B) can satisfy the claim.

What is claimed is:

1. A computer-implemented method comprising:
   receiving, by a client application at a client device, a unique identifier from a browser application at the client device, the unique identifier corresponding to an authenticated browser session for synchronizing content between the client device and a content management system via the browser application;
   sending, from the client application to the content management system, a request to establish a communication channel between the browser application and the client application through the content management system, the request comprising the unique identifier, wherein the unique identifier provides an association between the authenticated browser session and an application session between the client application and the content management system; and
   receiving, by the browser application via the authenticated browser session, a message relayed by the content management system through the communication channel, the communication channel being established based on the association between the authenticated browser session and the application session, wherein the message is associated with the application session.

2. The computer-implemented method of claim 1, wherein the request comprises a secure session request from the browser application to the client application.

3. The computer-implemented method of claim 2, wherein the secure session request is based on secure socket layer (SSL) protocol.

4. The computer-implemented method of claim 2, wherein the secure session request comprises a domain name, the domain name comprising a top-level domain associated with a localhost domain, and a subdomain comprising the unique identifier.

5. The computer-implemented method of claim 1, further comprising receiving, by the client application via the application session, a second message relayed by the content management system from a website, wherein the second message is associated with the unique identifier that corresponds to the authenticated browser session.

6. The computer-implemented method of claim 5, wherein the client application, the website and the content management system are part of a same content management service.

7. The computer-implemented method of claim 1, wherein the request comprises an instruction to the content management system to relay one or more messages from the client application to a website via a connection between the content management system and the website associated with the unique identifier.

8. The computer-implemented method of claim 1, further comprising sending, from the browser application to the content management system, a communication comprising the unique identifier and an instruction to the content management system to relay one or more messages from the browser application to the client application via the communication channel.

9. A system comprising:
one or more processors;
a computer-readable medium; and
computer-readable instructions, stored on the computer-readable medium, that when executed cause the one or more processors to:
receive, by a client application at a client device, from a browser application, a first message comprising a unique identifier, wherein the unique identifier corresponds to a browser session of the browser application at a website associated with a content management system;
extract, by the client application, the unique identifier from the first message;
establish an application session between the client application and the content management system by sending, from the client application to the content management system, a second message comprising the unique identifier, wherein the application session is for synchronizing content between the client device and the content management system via the client application; and
receive, by the browser application via the browser session, a third message relayed by the content management system based on the unique identifier, wherein the third message is associated with the application session.

10. The system of claim 9, wherein the browser application is at the client device and wherein the browser session is for synchronizing content between the client device and the content management system via the browser application.

11. The system of claim 9, wherein the first message comprises a secure session request from the browser application to the client application.

12. The system of claim 9, wherein the first message comprises an indication that the client application is expecting the third message from the browser application.

13. The system of claim 9, the computer-readable instructions, when executed, further cause the one or more processors to transmit, from the client application to the content management system, a fourth message comprising the unique identifier and an instruction to the content management system to relay one or more communications from the client application to the browser application via the browser session.

14. The system of claim 9, the computer-readable instructions, when executed, further cause the one or more processors to transmit, from the browser application to the content management system a fourth message comprising the unique identifier and an instruction to the content management system to relay one or more communications from the browser application to the client application via the application session.

15. A content management system comprising:
one or more processors; and
a computer-readable storage medium having stored therein instructions which, when executed by the one or more processors, cause the one or more processors to:
receive, from a client application of a client device, a request to establish a communication channel between a browser application and the client application through the content management system, the request comprising a first unique identifier, wherein the first unique identifier identifies a browser session at a website associated with the content management system;
establish an application session between the client application and the content management system which establishes the communication channel;
receive, via the application session, a first message comprising the first unique identifier, wherein the first unique identifier provides an association between the browser session and the application session; and
relaying, based on the first unique identifier, one or more communications between the application session and the browser session.

16. The content management system of claim 15, the computer-readable storage medium having stored therein instructions which, when executed by the one or more processors, cause the one or more processors to:
receive, from the browser application via the browser session, a second message that is associated with content items associated with a content management service; and
transmit, to the client application via the application session, a third message based on the second message.

17. The content management system of claim 16, wherein the first message comprises a request to establish a communication channel between the browser application and the client application through the content management system.

18. The content management system of claim 15, the computer-readable storage medium having stored therein instructions which, when executed by the one or more processors, cause the one or more processors to:

receive, from the client application via the application session, a second message that is associated with content items associated with a content management service; and transmit, to the browser application via the browser session, a third message based on the second message.

19. The content management system of claim 15, the computer-readable storage medium having stored therein instructions which, when executed by the one or more processors, cause the one or more processors to synchronize content between the client device and the content management system via a web interface associated with the content management system.

20. The content management system of claim 15, the computer-readable storage medium having stored therein instructions which, when executed by the one or more processors, cause the one or more processors to:

receive, from the browser application, a second message comprising a second unique identifier; and determine an association between the application session with the client application and the browser session with the browser application based on a match between the first unique identifier and the second unique identifier associated with the application session.

* * * * *